United States Patent [19]

Poehlsen

[11] Patent Number: 4,824,359

[45] Date of Patent: Apr. 25, 1989

[54] DUAL INJECTION MOLD PREFORM TRANSFER ASSEMBLY

[75] Inventor: Rudolf H. Poehlsen, Tecumseh, Mich.

[73] Assignee: Hoover Universal, Inc., Ann Arbor, Mich.

[21] Appl. No.: 170,785

[22] Filed: Mar. 21, 1988

Related U.S. Application Data

[63] Continuation-in-part of Ser. No. 941,768, Dec. 15, 1986, abandoned.

[51] Int. Cl.⁴ .............................................. B29C 49/00
[52] U.S. Cl. .................... 425/534; 425/539; 425/540; 414/744.2
[58] Field of Search ......................... 425/534, 537–539, 425/540; 414/753, 744 R

[56] References Cited

U.S. PATENT DOCUMENTS

| | | | |
|---|---|---|---|
| 3,048,890 | 8/1962 | Soubier | 425/534 |
| 4,403,907 | 9/1983 | Koller et al. | 414/744 R |
| 4,470,796 | 11/1984 | Stroup et al. | 425/534 |
| 4,552,526 | 11/1985 | Hafele | 425/534 |
| 4,730,976 | 3/1988 | Davis et al. | 414/744 R |

Primary Examiner—Bernard Nozick
Attorney, Agent, or Firm—Harness, Dickey & Pierce

[57] ABSTRACT

A preform transfer assembly for continuously transferring preforms from a pair of injection assemblies to a blow molding machine comprising a base supporting the mold assemblies, a frame assembly on the base, a slide plate slideably mounted on the frame, first actuator means mounted on the frame for raising and lowering the slide plate, a swing bracket assembly pivotally mounted on the slide plate and actuated by second actuator means also mounted on the slide plate rotating the swing bracket, an arm having one end attached to the swing bracket and the other end of the arm attached to a preform carrier assembly, third actuator means mounted on the arm for extending and retracting the arm in a horizontal direction, and grasping means attached to the carrier for engaging and releasing preforms whereby as the preforms are released out of the molds they are grasped and transferred to a blow molding machine. Transfer of preforms from one mold asssembly takes place while preforms in the other mold assembly are cooling in preparation for transfer.

21 Claims, 6 Drawing Sheets

DUAL INJECTION MOLD PREFORM TRANSFER ASSEMBLY

This is a continuation-in-part of application Ser. No. 941,768 filed Dec. 15, 1986 now abandoned.

BACKGROUND AND SUMMARY OF THE INVENTION

In a typical blow molding machine, a screw extruder delivers molten plastic to an injection molding station to form the plastic preforms. These preforms may then be removed, transferred, and stored for subsequent reheating and blowing operations to form the final containers.

Alternatively, the preforms may, while still in the blow molding machine, be heated appropriately and blown to their final shape. This type of injection blow molding machine is a one step injection stretch blow molding machine. This machine produces containers in an uninterrupted fashion from raw stock to completely finished products. This is in direct contrast to the two step "reheat and blow" process first described. The one step process retains some of the latent heat in the injection preforms allowing the containers to be stretched and blown without reheating them from a cold condition. This saves energy. In addition, the preforms remain oriented in the machine throughout the entire machine cycle.

The preforms, once formed, must be transferred to a stretch and blow station for final processing. In a typical one step stretch blow molding machine, the preforms are delivered to a blow molding carousel or table which communicates with several other stations positioned around the carousel. At these stations, the preforms are first tempered to achieve optimum temperature conditions. The preforms are then delivered to a stretch and blow station at which blowing fluid is introduced to cause the preforms to expand to form containers of the desired final shape. The containers are then cooled and removed from the carousel.

While blow molding machines of this type are effective in forming blow molded containers, the capacity of such machines is limited by the through put of the injection molding operation. Because the duration of the injection molding operation is often a function of the cooling time of the plastic preform in the injection mold, and therefore is relatively constant, it is often not possible to increase the through put of the injection molding operation to match the through put capability associated with the other stations. Without changing the through put of the injection molding portion, any change in the speed of the other operations would not increase the capacity of the one step blow molding machine. In addition, because the screw extruder does not deliver the molten plastic to the injection molding machine while the preforms are being cooled, the molten plastic may heat excessively in the extruder. Thus the injection molding step of the machine cycle takes the longest time. It is the limiting factor in the production process.

Adding a second injection mold and alternately feeding preforms through the subsequent stations can effectively double the output of containers in a given time for the carousel type machine. In the present invention, the single injection mold machine has been redesigned to accept two injection mold stations, working alternately. The duel mold assembly machine utilizes a hydraulically actuated melt diverter valve to direct melt alternately to either the left hand or the right hand injection mold assemblies. Since there are now two injection mold assemblies, a unique preform transfer mechanism according to the present invention is utilized to receive molds or preforms from the injection mold assemblies and loads them onto chucks or holders carried on the carousel portion of the machine.

It is therefore the primary object of the present invention to increase the capacity of blow molding machines of the one step type.

It is a further object of the present invention to provide a transfer mechanism for transferring preforms between the mold cavities and appropriate stations on the carousel.

These and other advantages of the present invention will become apparent by a consideration of the following detailed description of the invention when taken in conjunction with the attached drawings and appended claims.

DETAILED DESCRIPTION OF THE INVENTION

Figure 1:
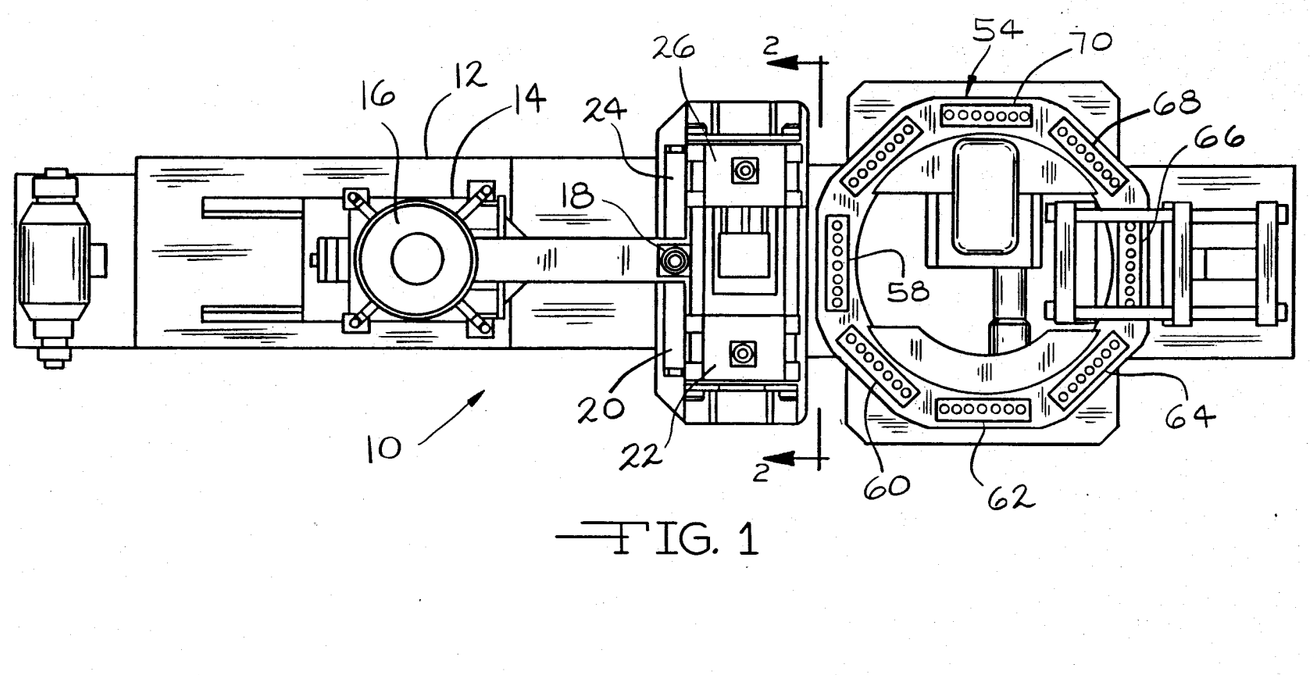
FIG. 1 is a top plan view of the one step injection stretch blow molding machine having a transfer assembly in accordance with the teachings of the present invention.

An injection stretch blow molding machine of the one step injection stretch blow molding process is illustrated in FIG. 1. The machine 10 according to the present invention is comprised of several sub assemblies mounted upon bed plate 12. Reciprocating screw extruder 14 receives plastic pellets from hopper 16. These plastic pellets are then plasticized by the reciprocating screw extruder 14 and fed to melt diverter valve 18. According to the position of the melt diverter valve 18, melt is alternately admitted via left manifold passage 20 to the left hand preform injection mold assembly 22 and via right manifold passage 24 to right hand preform injection mold assembly 26.

Figure 2:
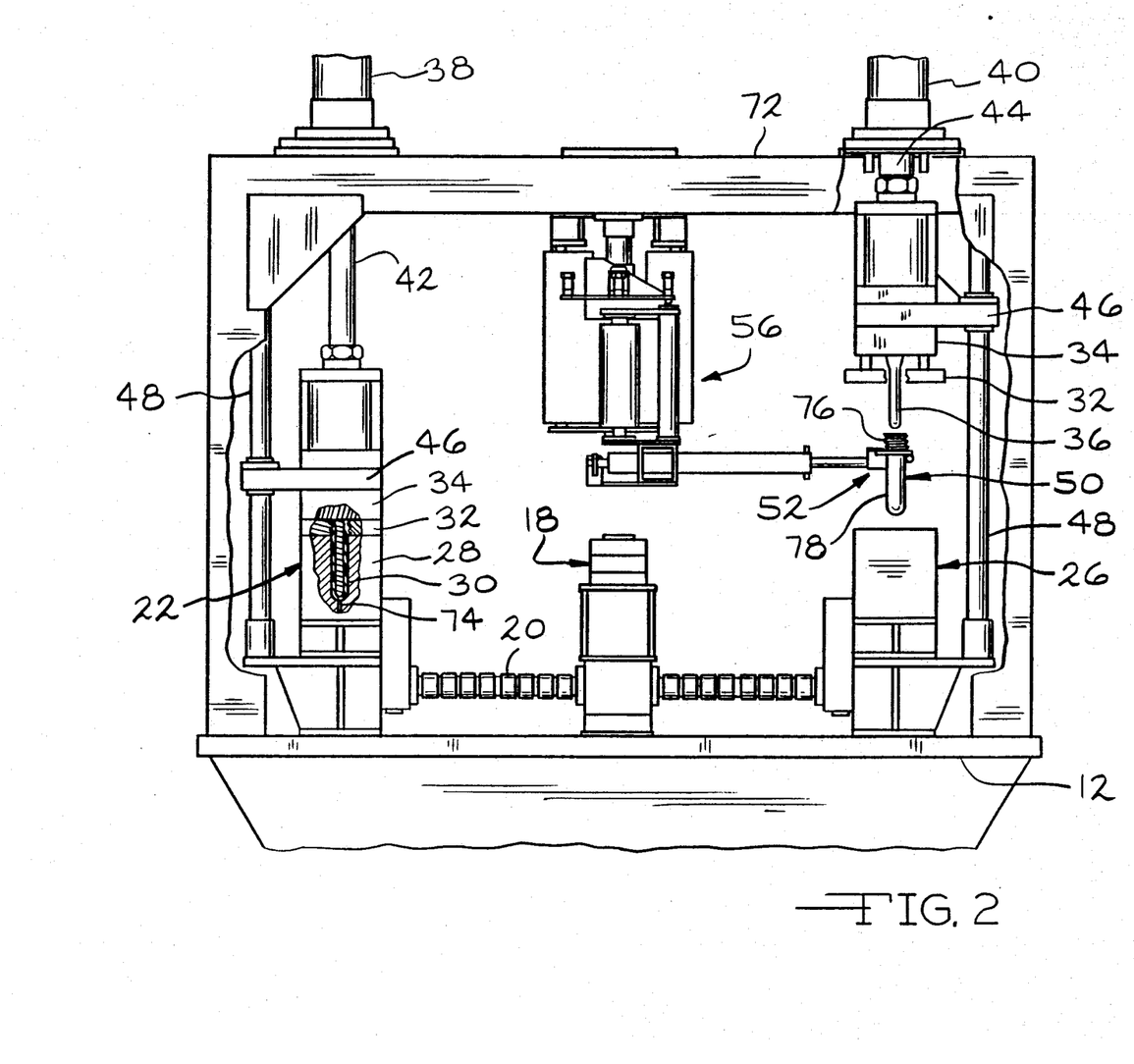
FIG. 2 is a view taken along line 2—2 shown in FIG. 1.

In FIG. 2, left hand mold assembly 22 is shown closed, ready for receipt of melt through diverter valve 18, left manifold passage 20 and into injection mold assembly 22. Mold assemblies 22 and 26 each include a mold 28 having multiple cavities 30, a neck forming portion 32, and a core rod block 34 having multiple core rods 36. Core rods 36 extend downward from core rod block 34 into the cavities 30 in mold 28. Sandwiched between core rod block 34 and mold 28 is neck forming portion 32.

The core rod blocks 34 and neck forming portions 32 for mold assemblies 22 and 26 are supported and actuated by left and right hydraulic cylinders 38 and 40.

Hydraulic cylinders 38 and 40 have corresponding hydraulic pistons 42 and 44 each connected to a core rod block 34. Hydraulic pistons 42 and 44 each raises and lowers core rod block 34 and neck forming portion 32 into and out of engagement with mold 28. This vertical motion is guided by sleeve portions 46 of core rod blocks 34 which slide on guide rods 48.

The view of FIG. 2 shows mold assembly 22 in the position ready to receive plasticized melt through melt diverter valve 18 and manifold passage 20. Right preform injection mold assembly 26 is shown in the open position wherein preforms 50 have been deposited onto preform carrier 52 for transfer to carousel 54.

When the injection of melt is complete and sufficient cooling has taken place within mold 28, core rod block 34, having core rods 36 attached, is hydraulically raised from mold 28. Moving with core rod block 34 is neck forming portion 32. Neck forming portion 32 remains closed, gripping preforms 50. Thus the preforms are raised out of mold 28, still intact on core rods 36. As core rod block 34 nears the end of its upward travel, neck forming portion 32 stops moving upward, stripping preforms 50 from core rods 36.

Neck forming portion 32 open outward when core rod block 34 reaches its upper limit of travel, allowing the preforms to drop onto preform carrier 52. Preform transfer assembly 56 retracts carrier 52, indexes 90 degrees in a horizontal plane, and then raises, or lowers, and extends carrier 52 in order to deposit the preforms into receiving station 58 on carousel 54 for subsequent blow molding operations.

Once the preforms have been positioned in receiving station 58, carousel 54 is rotated or indexed in a counter clockwise direction 45 degrees to position the preforms at cooling station 60. Station 58 remains the position where preforms 50 are inserted onto the carousel. Station 60 is used to cool the preforms. The next stations, first and second heating stations 62 and 64, are used to thermally temper the preforms in preparation for stretching and blowing at station 66. At station 68, the preforms are cooled and static electricity is discharged. At station 70, the preforms are discharged from the carousel. Each time carousel 54 is indexed 45 degrees counterclockwise, completed bottles are removed at discharge station 70 so that an empty set of preform receivers or holders are present at receiving station 58 each time a new set of preforms are delivered by preform carrier 52.

In order to transfer the preforms formed in the left hand and the right hand mold assemblies 22 and 26, a hydraulically controlled and actuated preform transfer assembly 56 according to the present invention is utilized. This transfer assembly receives preforms alternately from mold assemblies 22 and 26, and indexes 90 degrees clockwise or counter clockwise as required to position and release the preforms at station 58 on carousel 54. Preform transfer assembly 56 is bolted to frame 72 as shown in FIG. 2. Frame 72 has been removed for illustrative purposes in FIG. 1.

Figure 3:
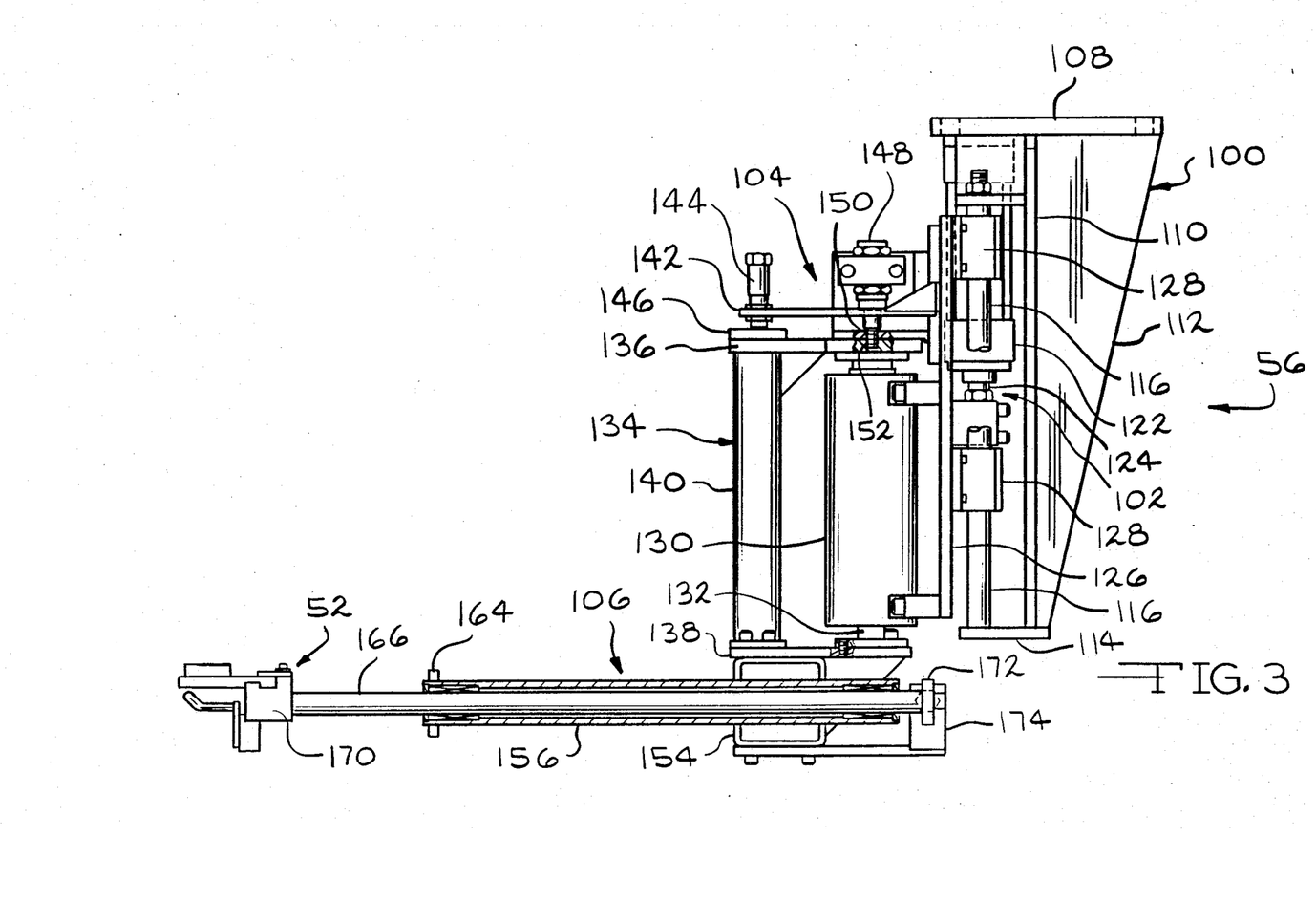
FIG. 3 is a side view of the transfer assembly according to the present invention.

An enlarged side view of the transfer assembly 56 according to one embodiment of the present invention is shown in FIG. 3. The transfer assembly 56 comprises frame bracket 100 bolted to frame 72, lift assembly 102 slidably mounted on frame bracket 100, motor assembly 104 fixed to lift assembly 102, arm assembly 106, and preform carrier 52 attached to one end of arm assembly 106. Preform carrier 52 grasps preforms 50 as they are released alternately from mold assembly 22 and mold assembly 26. Motor assembly 104 and lift assembly 102 cooperate to rotate and vertically move arm assembly 106 to transfer preforms between mold assemblies 22 and 26 and carousel 54.

Frame bracket 100 includes horizontal top plate member 108 which is bolted to frame 72, and vertical plate 110 which extends downward from the underside of upper plate 108. Gusset plates 112 rigidly support vertical plate 110 off of top plate 108. Along the bottom of vertical plate 110 is bottom plate 114. A pair of guide rods 116 and 118 are rigidly mounted to bottom plate 114 and are axially positioned vertically parallel to vertical plate 110. The upper ends of guide rods 116 and 118 are bolted to upper guide rod support plates 120 off of vertical plate 110.

Hydraulic cylinder 122 is vertically mounted and has one end attached to the underside of frame bracket top plate 108. Piston rod 124, protruding from the other end of hydraulic cylinder 122, is attached to slide plate 126 via clamp 127. Hydraulic cylinder 122 is positioned so that piston rod 124 extends and retracts parallel to and between guide rods 116 and 118.

Lift assembly 102 is slidably mounted on frame bracket 100. Lift assembly 102 comprises slide plate 126 which has two pairs of sleeve bushings 128 fixed to one side of slide plate 126 and around guide rods 116 and 118. Piston rod 124 is fixed to slide plate 126 via clamp 127 so that slide plate 126 moves vertically upward and downward with the extension and retraction of piston rod 124.

Mounted to the other side of slide plate 126 is motor assembly 104. Motor assembly 104 includes rotational motor 130 bolted to slide plate 126 with its axis vertical and parallel to slide plate 126. Rotational motor 130 has a rotating shaft 132 which extends out of the upper and lower end of rotational motor 130.

Shaft 132 rotates swing bracket 134. The upper end of shaft 132 is attached to one end of upper horizontal bracket member 136. The lower end of shaft 132 is fixed to one end of lower horizontal bracket 138. Vertical brace 140 extends vertically between the other ends of bracket members 136 and 138 forming swing bracket 134.

Mounted off of slide plate 126 and parallel to upper horizontal bracket member 136 is semi-circular shaped switch mounting bracket 142. Three proximity switches 144 are mounted on switch mounting bracket 142 and spaced 90 degrees apart. Trigger bar 146 which projects upward from the upper surface of upper horizontal bracket member 136 contacts the proximity switches 144 to indicate 90 degree displacement positions as swing bracket 134 is rotated by rotional motor 130.

Also mounted above upper bracket member 136 and to slide plate 126 is index cylinder 148 which has a movable index pin 150 extending vertically downward therefrom. Index pin 150 engages aligning holes 152 in upper bracket member 136 to precisely align swing bracket 134 in each of the three 90 degree positions.

Arm assembly 106 is mounted to the underside of bracket member 138 via arm support member 154. Arm assembly 106 basically includes two parallel guide tubes 156 and 158 horizontally mounted near one end to arm support 154. Positioned between guide tubes 156 and 158 is hydraulic cylinder 160. Hydraulic cylinder 160 has one end fixed to arm support member 154 and is oriented so that piston rod 162 extends and retracts coaxially with guide tubes 156 and 158. Guide tubes 156, 158 and hydraulic cylinder 160 are maintained in spaced apart parallel position by arm support plate 164 which is fixed to the other ends of guide tubes 156, 158 and hydraulic cylinder 160.

Slidably disposed within guide tubes 156 and 158 are guide rods 166 and 168 respectively. One end of each guide rod is fixed to carrier bar 170. The other end of each guide rod extends through the guide tube 156 or 158 and projects from the opposite end. Attached to the free end of guide rod 166 is trigger bar 172. Trigger bar 172 coacts with proximity switch 174 mounted on arm support member 154 to sense and indicate the proper extend position of arm assembly 106.

The exposed end of piston rod 162 is bolted to carrier bar 170. Therefore, as piston rod 162 extends or retracts into cylinder 160, carrier bar 170 moves from an extended to a retracted position. This travel is approximately six inches in the prototype design.

Figure 4:
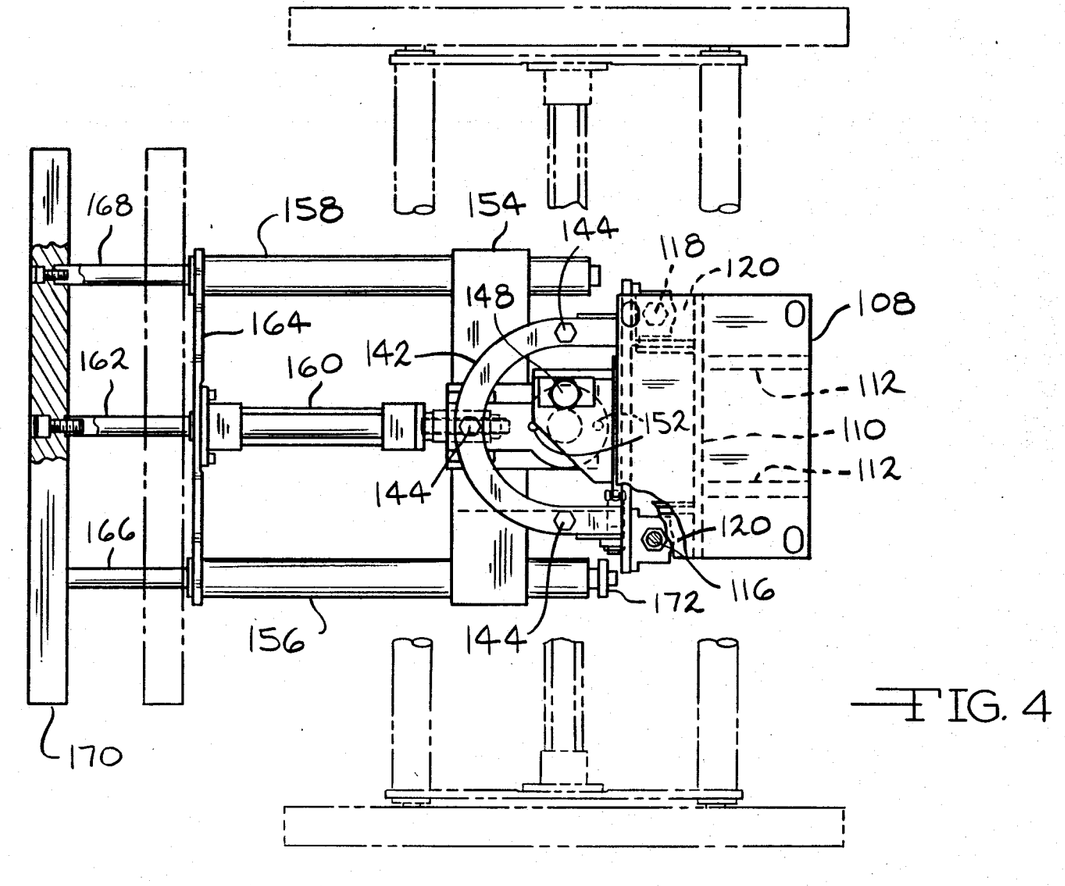
FIG. 4 is a top view of the preform transfer assembly according to the present invention showing the three index positions.

Although not shown in FIG. 4, the preform carrier 52 includes carrier bar 170. FIG. 4 illustrates the extended and retracted positions of carrier bar 170 and the three 90 degree rotational positions of pivot motor assembly 104 to position carrier bar 170 and preform carrier 52 in three 90 degree displaced positions.

Figure 5:
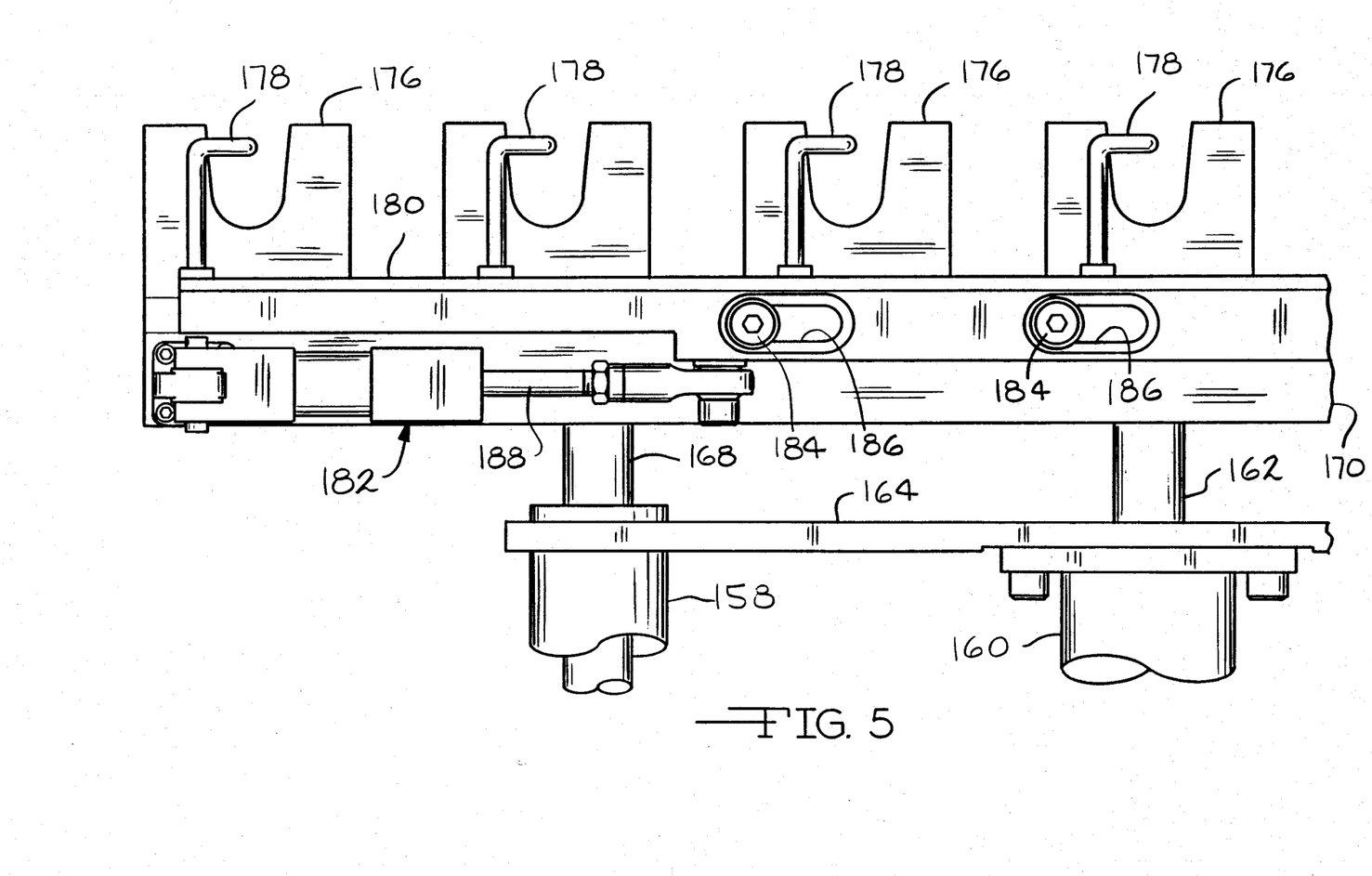
FIG. 5 is an enlarged bottom view of a portion of the preform carrier according to one embodiment of the present invention.
Figure 6:
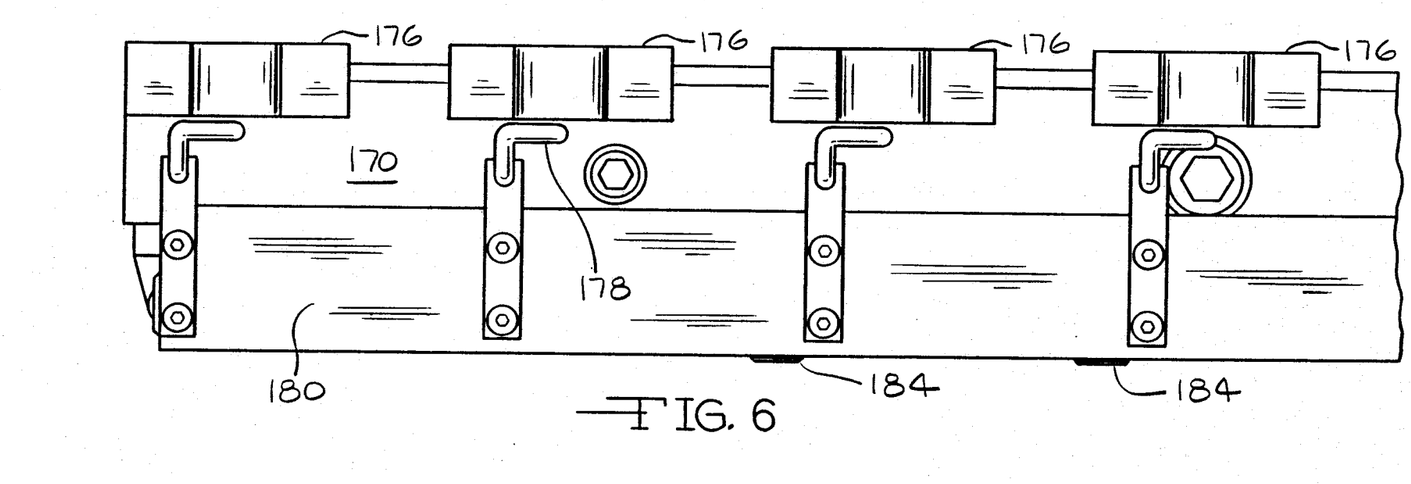
FIG. 6 is a front end view of a portion of the preform carrier shown in FIG. 5.
Figure 7:
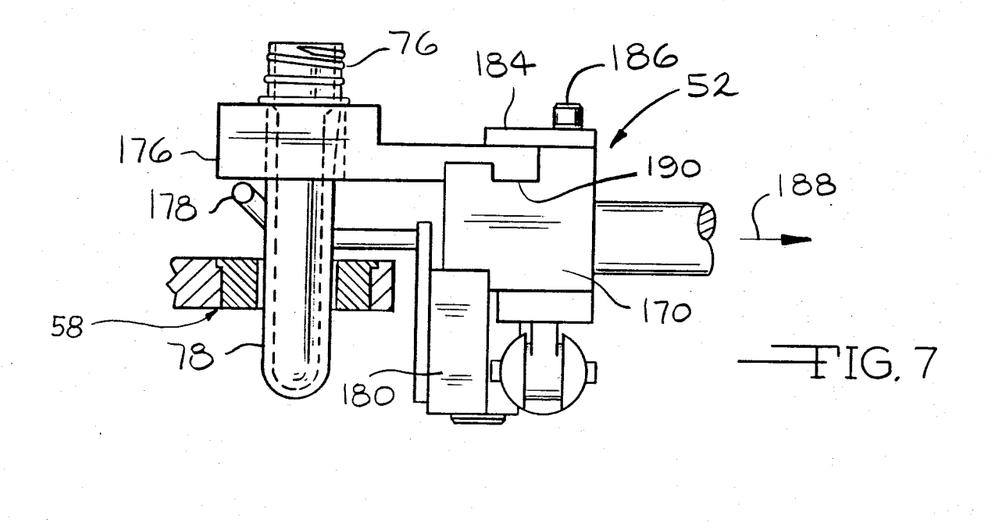
FIG. 7 is a side view of the preform carrier shown in FIG. 5.

One embodiment of a preform carrier according to the present invention is shown in FIGS. 5, 6, and 7. Preform carrier 52 includes elongated rectangular carrier bar 170, preform receivers 176, retaining fingers 178 supported from retaining bar 180, and hydraulic actuator 182.

Carrier bar 170 has a pair of guide pins 184 extending downward from the underside thereof as shown in the underside view of FIG. 5. Guide pins 184 reside in slots 186 in retaining bar 180. Piston rod 188 has its free end pivotally attached to retaining bar 180. The other end of piston rod 188 extends into one end of hydraulic actuator 182. The other end of hydraulic actuator 182 is pivotally attached to carrier bar 170. Extending outward from retaining rod 180 are retaining fingers 178. Therefore retaining fingers 178 move with retaining bar 180 as hydraulic actuator 182 moves retaining bar 180 back and forth.

As shown in the partial front view of the preform carrier 52 according to the present invention, shown in FIG. 6, a plurality of preform receivers 176 are mounted to and extend outward from carrier bar 170. Preform receivers 176 have a generally U-shaped opening for receiving preforms 50. The rear portion of each preform receiver 176 is notched to fit within a corresponding notch 190 in carrier bar 170. Clamp plate 184 retains preform receivers 176 in position by clamp screws 186.

Retaining fingers 178 are curved hooked shaped metal rods which slide via retaining bar 180 in slots 186 so as to engage preforms inserted into the preform members 176. When hydraulic actuator 182 retracts, retaining fingers 178 are moved to the side allowing preforms resting in preform receivers 176 to be released into preform receiving station 58 as shown in FIG. 7 as preform carrier 52 is moved in the direction of the arrow 188.

Receivers 176 and retaining fingers 178 may taken on various shapes and configurations depending on the particular shape of the preforms to be handled. In addition, any number of receivers and fingers may be utilized depending upon the particular design and capacity of the mold assemblies.

Thus is can be seen that the retaining of preforms 50 by preform carrier 52 is carried out by hydraulic actuator 182 extending or retracting to engage or disengage retaining fingers 178 with preforms 50 residing on preform receivers 176. The preform carrier 52 is then moved horizontally by extension or retraction of piston rod 162 in hydraulic cylinder 160. Horizontal motion is guided by guide rods 166 and 168 residing in guide tubes 156 and 158 respectively. Tubes 156 and 158 are in turn supported by arm supporting member 154.

The whole arm assembly 106 is rotated via pivot motor assembly 104 which comprises rotational actuator 130. Actuator 130 is rotated in 90 degree intervals and indexed to the proper position by the coaction of index pin 150 in holes 152 in upper horizontal bracket member 136. Both motor assembly 104 and arm assembly 106 attached thereto are raised and lowered by lift assembly 102 as piston 124 retracts and extends from hydraulic cylinder 122.

Operation of hydraulic cylinders 122, 160, 182 and rotational motor 130 allow the preforms 50 to be removed from each mold assembly and transferred to the blow molding carousel receiving station 58 alternately as they are formed from mold assembly 22 and mold assembly 26 in a continuous fashion, thereby doubling the through put of a one step injection blow molding machine.

From the above description it is seen that this invention provides a unique preform transfer assembly for transferring preforms alternately and in a continuous manner so as to enhance the through put in a one step injection blow molding machine. The present invention has been described in an illustrative manner and it is to be understood that the terminology which has been used is intended to be in the nature of words of description other than that of limitation. Obviously many modifications and variations of the present invention are possible in light of the above teachings. It is therefore to be understood that in the scope of the above claims, the invention may be practiced other than as specifically described.

What is claimed is:

1. An apparatus for continuously transferring preforms from a pair of injection mold assemblies to a blow molding machine, said mold assemblies each including a mold having a cavity therein, a neck forming portion, and a core rod block having a core rod projecting therefrom into said cavity when said mold assembly is closed, said preforms being removed from said cavity by said core red block and neck forming portion moving away together from said mold, said preform being carried on said core rod and gripped by said neck forming portion, said preform being stripped from said core rod by separation of said neck forming portion from said core rod block and released by said neck forming portion, said apparatus comprising:

a base supporting said mold assemblies in a spaced apart relation;

a frame assembly on said base;

holding means for releasably holding said preforms as they are released from said pair of injection mold assemblies;

arm means attached at one end to said holding means for translational movement of said holding means;

lift means attached to said frame assembly for raising and lowering said arm means; and motor means at the other end of said arm means for rotating said arm means about a vertical axis, said motor means being attached to said lift means, whereby as said preforms are released from one of said pair of mold assemblies they are received by said holding means, moved horizontally over said base by said arm means, raised by said lift means, rotated by said motor means about said vertical axis, said holding means then releasing said preforms so as to position said preforms in said blow molding machine.

2. The apparatus according to claim 1 wherein said holding means comprises:
an elongated carrier bar member attached to said arm means for supporting said preforms;
a plurality of preform receiving members mounted on said carrier bar member for receiving preforms as they are released from each of said mold assemblies; and
a retaining member movably attached to said carrier bar member, said retaining member being selectably movable between an engaged position and a disengaged position with said preforms when said preforms rest in said receiving members to keep said preforms on said receiving members during transfer from said mold assembly to said blow molding machine.

3. The apparatus according to claim 2 wherein said holding means further comprises an actuator having one end attached to said carrier bar member, the other end attached to said retaining member whereby said actuator moves said retaining member between said engaged and disengaged positions.

4. The apparatus according to claim 3 wherein said actuator is a fluid cylinder pivotally mounted at one end to said carrier bar member, said cylinder having a cylinder rod pivotally mounted to said retaining member.

5. The apparatus according to claim 3 wherein said retaining member is an elongated rectangular bar having a plurality of outwardly projecting hooked fingers, each finger positioned horizontally on one of said receiving members so as to retain said preform on said receiving member when said retaining member is in said engaged position and release said preforms from said receiving members when said retaining member is in the disengaged position.

6. The apparatus according to claim 5 wherein said retaining member has an elongated slot therethrough, and said carrier bar further comprises a pin projecting from said bar through said slot in said retaining member whereby movement of said retaining member is guided by said pin in said slot.

7. The apparatus according to claim 6 wherein said arm means further comprises a support member fixed between said guide tube and said cylinder actuator to maintain parallel alignment of said actuator to said guide tube.

8. The apparatus according to claim 1 wherein said arm means comprises:
a guide tube fixed to said motor means;
a guide rod slidably disposed within said guide tube to maintain horizontal alignment of said holding means, said rod having one end attached to said holding means, the other end projecting through said guide tube;
an extensible fluid cylinder actuator mounted parallel to said guide tube between said motor means and said holding means for horizontally moving said holding means whereby said cylinder actuator and said guide rod cooperate to extend and retract said holding means in a horizontal direction over said base.

9. The apparatus according to claim 8 wherein said guide rod includes a proximity switch fixed to said other end of said rod engagable with said motor means to sense the position of said guide rod relative to said motor means, said switch actuating to terminate extension of said arm means at a predetermined position.

10. In an injection stretch blow molding machine having a bed plate having mounted thereon a carousel dial plate assembly for stretch and blow forming operations, a bridge frame assembly, an extruder assembly, a plurality of injection mold assemblies for forming preforms, said mold assemblies being mounted under said bridge frame assembly on said bed plate, and a melt diverter valve for directing melt alternately between said injection mold assemblies, a transfer assembly for transferring said preforms from said molds to said dial plate assembly comprising:
a frame bracket attached to said bridge frame assembly;
a slide plate slidably mounted on said frame bracket;
first actuator means mounted on said frame bracket for raising and lowering said slide plate;
a swing bracket assembly pivotally mounted on said slide plate;
second actuator means mounted on said slide plate for rotating said swing bracket assembly;
arm means attached to said swing bracket assembly for supporting a preform carrier displaced from said slide plate;
third actuator means mounted on said arm means for extending and retracting said preform carrier; and
holding means attached to said carrier for releasably holding said preforms whereby as preforms are released from said molds they are received by said holding means and transferred from said mold to said carousel dial plate assembly where said preforms are released onto said dial plate assembly for subsequent stretching and blowing of said preforms into finished shape.

11. The transfer assembly according to claim 10 wherein said frame bracket comprises:
a horizontal top plate fixed to said bridge frame;
a vertical plate having its upper edge fixed to said top plate;
a guide rod mounted vertically from said vertical plate; and
a gusset plate vertically mounted at right angles to said vertical plate, said gusset plate being fixed to said top plate and said vertical plate so as to rigidify said vertical plate and said guide rod.

12. The transfer assembly according to claim 11 wherein said first actuator means comprises a fluid actuated cylinder vertically mounted on said frame bracket parallel to said guide rod, said cylinder having a cylinder rod therein extensible from one end of said cylinder in a direction parallel to said guide rod, said rod being fixed to said slide plate whereby as said cylinder rod is extended out of and retracted into said cylinder, said side plate is moved vertically.

13. The transfer assembly according to claim 12 wherein said slide plate has a bushing sleeve mounted thereon encircling said guide rod to slidably guide said slide plate during vertical motion of said slide plate.

14. The transfer assembly according to claim 13 wherein said slide plate further comprises a first proximity switch mounted on said frame bracket engagable with said slide plate to sense vertical position of said slide plate with respect to said frame bracket.

15. The transfer assembly according to claim 14 wherein said second actuator means comprises a fluid actuated rotational motor having a central rotatable shaft having two opposing ends extending out of said motor, said motor being vertically mounted on said slide plate with said shaft along a central vertical axis, which rotates said swing bracket about said central axis.

16. The transfer assembly according to claim 15 wherein said swing bracket comprises:
   an upper horizontal swing bracket member attached to the upper end of said shaft, said bracket member having a trigger bar protruding from the upper side thereof;
   a lower horizontal swing bracket member attached to the lower end of said shaft;
   a brace member connected between said upper and lower swing bracket members parallel to said shaft to maintain said members in spaced apart alignment;
   a semicircular proximity switch mounting plate mounted to said slide plate and projecting parallel to and above said upper swing bracket member; and
   a second proximity switch mounted on said proximity switch mounting plate, said switch being engagable with said trigger bar as said swing bracket is rotated about said central axis whereby said members cooperate to form said swing bracket and precise rotational position of said swing bracket with respect to said slide plate is sensed by said proximity switch when said switch contacts said trigger bar.

17. A transfer assembly according to claim 16 wherein said upper swing bracket member further comprises an elongated plate having a straight portion and a circular portion, said circular portion having a hole therein spaced from the center of said circular portion, said plate being attached to said shaft at the center of said circular portion, and said straight portion of said plate being attached to said brace member.

18. The transfer assembly according to claim 17 wherein said slide plate further comprises an index plunger cylinder mounted thereon having a plunger engagable with said hole in said circular portion of said elongated plate to thereby accurately stop rotation of said swing bracket at a desired position determined by the location of said hole.

19. The transfer assembly according to claim 18 wherein said arm means comprises:
   an arm support bracket fixed to said lower swing bracket member;
   a guide sleeve extending horizontally through and fixed to said arm support bracket; and
   a guide shaft slidably disposed within said guide sleeve, said guide shaft having said preform carrier fixed to one end of said guide shaft whereby said perform carrier is moved backwards and forwards as said guide shaft slides horizontally within said guide sleeve.

20. The transfer assembly according to claim 19 wherein said arm means further comprise a proximity switch mounting bracket fixed to said arm support bracket and a proximity switch mounted thereon engagable with a trigger tab fixed to one end of said guide shaft so as to sense position of said preform carrier attached to the opposite end of said guide shaft.

21. The transfer assembly according to claim 20 wherein said third actuator means comprises a hydraulic cylinder mounted parallel to said guide tube having one end fixedly supported by said arm support bracket, said cylinder having a cylinder rod extending from the opposite end of said cylinder, and the free end of said cylinder rod being attached to said preform carrier whereby hydraulic fluid pressure applied to said hydraulic cylinder moves said preform carrier in a horizontal direction.

* * * * *